Nov. 22, 1927.
P. S. HENDERSON
1,650,513
CANDY CRYSTALLIZING MACHINE
Filed Feb. 5, 1926    3 Sheets-Sheet 1
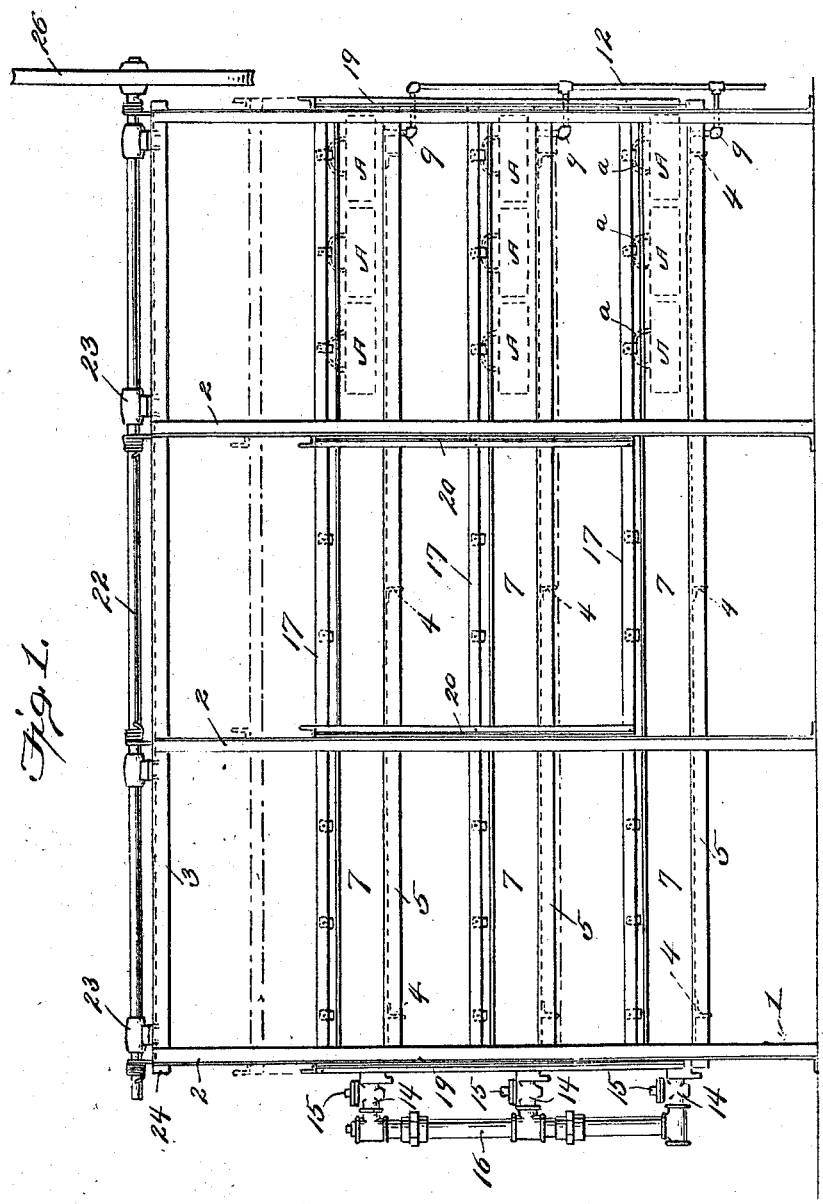
Inventor
Paul S. Henderson
By
Attorney

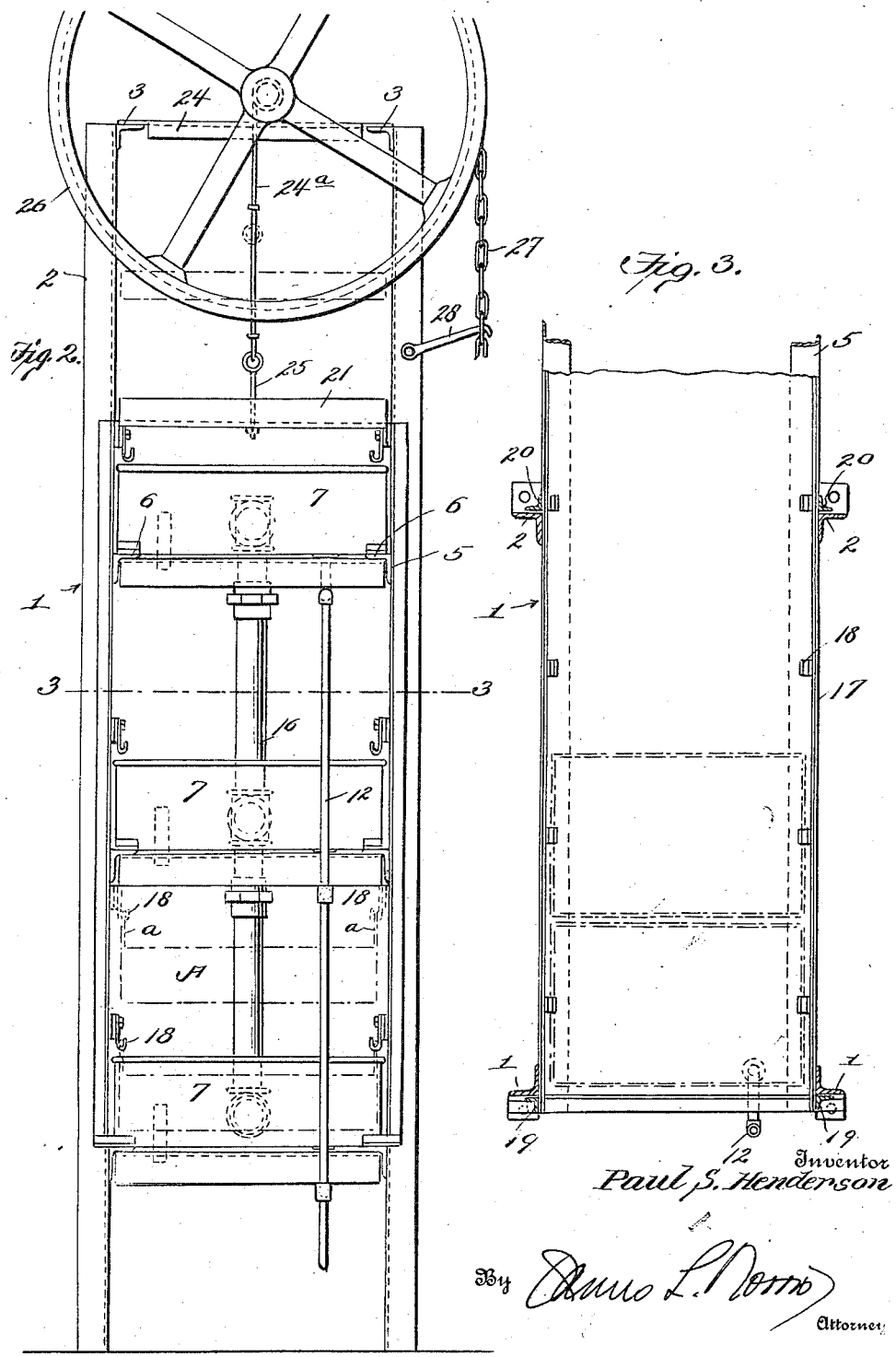

Nov. 22, 1927. 1,650,513
P. S. HENDERSON
CANDY CRYSTALLIZING MACHINE
Filed Feb. 5, 1926 3 Sheets-Sheet 3
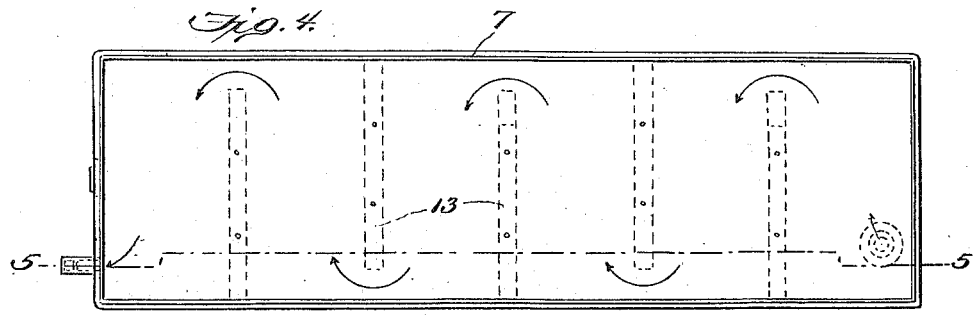
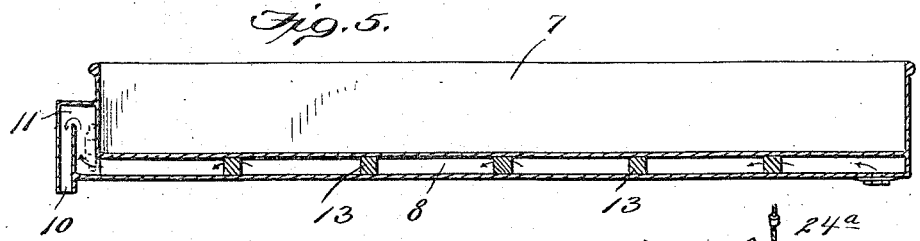
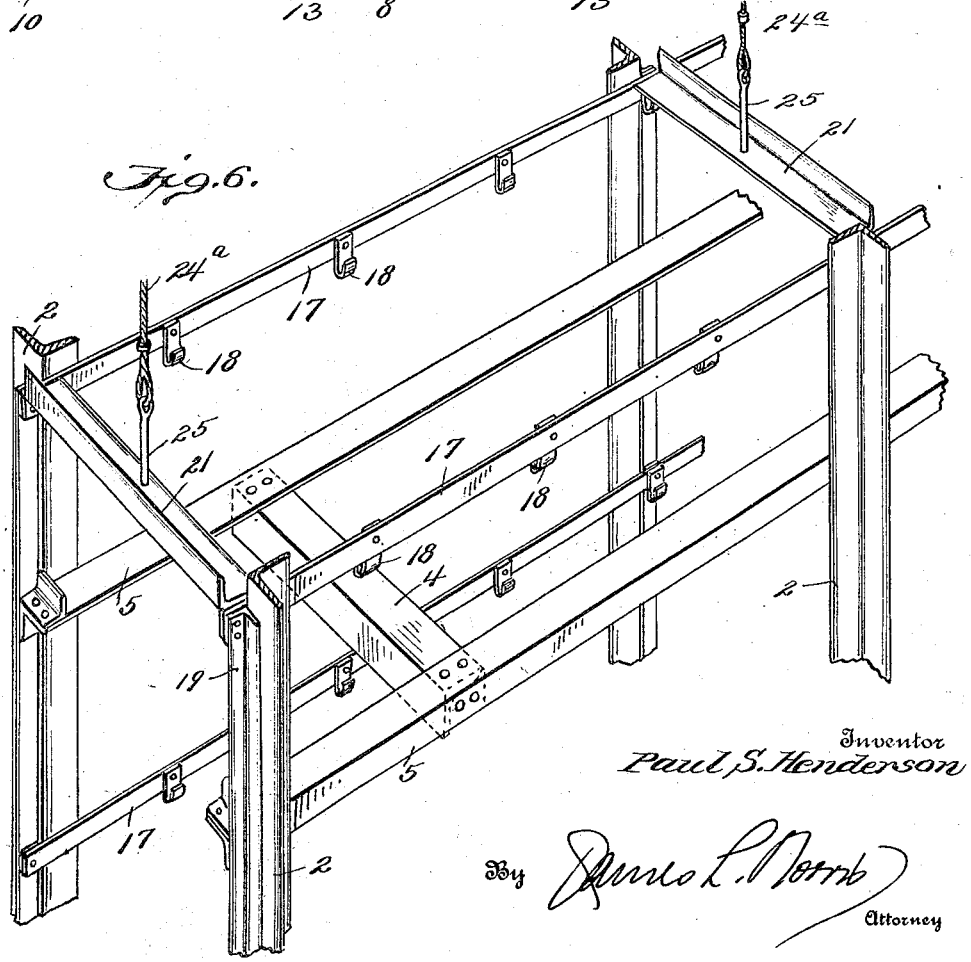
Inventor
Paul S. Henderson
By
Attorney Patented Nov. 22, 1927.

1,650,513

UNITED STATES PATENT OFFICE.

PAUL SIDNEY HENDERSON, OF CHATTANOOGA, TENNESSEE.

CANDY-CRYSTALLIZING MACHINE.

Application filed February 5, 1926. Serial No. 86,301.

The present invention relates to improvements in machines for use in the coating of confections, and it pertains more particularly to machines for dipping candy for the purpose of applying a crystalline coating thereto.

The primary object of the invention is to provide a novel and improved machine of this class whereby a large quantity of candy can be dipped into the crystallizing syrup and thus coated, and then removed from the syrup to positions which permit draining all surplus syrup therefrom back to the syrup baths, thereby economizing in time and labor and avoiding waste or loss of material, and effecting uniformity and thoroughness in the coating or crystallization.

Another object of the invention is to provide a machine of this class which enables the pieces of candy to be crystallized to be introduced into baskets at a convenient place and while the baskets are removed from the machine, and the filled baskets to be placed in the machine ready for dipping, and which enables the baskets containing the dipped or crystallized candy, after the surplus syrup has drained therefrom, to be removed from the machine to a place where the candy may be conveniently packed.

Further objects of the invention are to provide a machine of this class having means whereby the crystallizing syrup may be easily and quickly introduced into the dipping pans prior to the dipping of the candy therein and removed from the pans after dipping, thus enabling successive crystallizing operations to be performed most efficiently and uniformly and avoiding waste or loss of the syrup, and insuring the maintenance of sanitary conditions; and to provide means for cooling the syrup in the pans preparatory to the dipping of the candy therein.

To these and other ends, the invention consists in certain improvements and combinations and arrangements of parts, all as will be hereinafter more fully described, the features of novelty being pointed out particularly in the claims at the end of the specification.

In the accompanying drawings:—

Figure 1 is a side elevation of a candy crystallizing machine constructed in accordance with the present invention;

Figure 2 is an end elevation on an enlarged scale of the machine as shown in Figure 1 as viewed from the right-hand end thereof;

Figure 3 represents a horizontal section through a portion of the machine taken on the line 3—3 of Figure 2;

Figure 4 is a top plan view of one of the syrup pans;

Figure 5 represents a vertical section through the syrup pan taken on the line 5—5 of Figure 4; and Figure 6 is a detail perspective view of a portion of the rack which carries the candy baskets.

Similar parts are designated by the same reference characters in the several views.

The present invention provides an apparatus which is capable of use generally where it is desirable or necessary to dip or immerse candy or other confections in coating liquids contained in trays, although the invention is particularly adapted to the dipping of candy into syrup to apply a crystalline coating thereto. The preferred embodiment of the invention is shown in the accompanying drawings and will be hereinafter described in detail, but it is to be understood that the invention is not restricted to the precise construction shown, as equivalent constructions are contemplated, and such will be included within the scope of the claims.

In the present instance, the machine or apparatus comprises a frame 1 which may be of any suitable size and construction, it being preferable to construct this frame of upright angle iron members 2 which are connected at the top by longitudinal members 3 which are also preferably composed of angle irons. The flanges of the upright angle irons at the ends of the frame are preferably turned outwardly as shown. This frame which supports the various parts of the machine may be secured to a floor by bending the lower ends of the upright angle irons 2, as shown, or casters may be fitted to the lower ends of these angle irons where it is desirable that the machine be portable.

A number of pairs of members 5 extend longitudinally at the inner sides of the upright members 2, and at different heights in the frame to form shelves for the syrup pans, these members being connected by a suitable number of cross members 4. Preferably, and as shown, these members 5 are composed of angle iron, one flange of which is turned downwardly and is bolted or otherwise secured to the inner flanges of the upright members 2 and the other flange of which is turned horizontally inwardly to form a ledge 6. The ledges 6 of each pair of these shelf members are located at the same level but on opposite sides of the frame and they thus provide rails or supports on which the respective syrup pans 7 may be placed and supported. These pans may be placed in position or removed from the frame by endwise movement thereof between the opposite sides of the frame. Preferably, the members 5 are located at such heights in the frame that the syrup pans 7 will be spaced at equal distances vertically. It will be understood that the syrup pans when placed in the frame remain in relatively fixed positions therein during the use of the machine.

The syrup pans may all be of similar construction and the dimensions of these pans may be varied to conform with the capacity of the machine. Preferably, and as shown, each pan is adapted to receive the crystallizing syrup in its upper portion and is provided in the base thereof with a passageway 8 through which water may be circulated for the purpose of cooling the hot syrup to the proper temperature before the candy is dipped therein. The water may be introduced into one end of this passage 8 by means of a pipe 9 which connects with this passage at one end and the water may discharge from this passageway through an outlet 10 at the opposite end of the pan, a trap 11 being preferably provided at the outlet to insure filling of the passageway 8 with water. The water inlet pipes 9 of the different pans may be connected to a common water supply pipe 12 and the outlets 10 may be connected by a suitable pipe to a sewer or other means of disposal. The trap by insuring complete filling of the passageway 8 with water maintains the water in contact with the bottom of the pan which contains the hot syrup, and, hence, uniform and efficient cooling of the syrup is attained. To further improve the efficiency and uniformity of the cooling action of the water, a number of baffles 13 may be placed in the passageway 8 and arranged transversely therein in alternating relation, so that the water in flowing from the inlet to the outlet of the passageway 8 follows a tortuous or zig-zag path, as indicated by the arrows in Figure 4, short-circuiting of the water circulation through the cooling jacket or passageway being thus prevented.

The syrup pans are connected to receive and discharge the syrup through inlets 14 which are preferably provided with valves 15, and these inlets 14 are preferably connected to a common supply pipe 16 through which the hot syrup may be drawn from a cooker and supplied to the pans preparatory to the candy-dipping operation and through which the syrup may be drawn from the pans after the dipping operation and returned by a pump or other suitable means to the cooker.

The present invention provides means whereby the pieces of candy to be dipped may be placed in baskets, the baskets containing the candy may be placed in the machine and a considerable number of these baskets may be simultaneously manipulated to dip the pieces of candy therein into the crystallizing syrup in the different pans, and then simultaneously raised to remove the candy from the syrup but suspend it in a position above the syrup pans to permit surplus syrup thereon to drain back into the pans, after which the baskets containing the coated candy may be removed from the machine and transported to a place where the candy may be conveniently packed. Accordingly, a rack is provided which is movable vertically within the stationary frame and is provided with means which detachably support the candy baskets, so that the latter during vertical movements of the rack within the frame will descend into or rise upwardly out of the syrup pans. This vertically reciprocatory rack may be constructed in different ways, it consisting, in the present instance, of pairs of longitudinal rails 17 having hooks 18 at their inner sides on which the handles a of the baskets A may be engaged so that the baskets will be suspended therefrom, and these longitudinal bars have vertical rails 19 riveted or otherwise secured thereto, these vertical rails being preferably composed of angle iron, as shown in detail in Figure 6 and having their out-turned flanges arranged to bear flatwise against the out-turned flanges of the upright members 2 of the stationary frame, thus providing efficient guides for the rack in its vertical movements within the frame. Similar intermediate rails 20 may be secured to the bars or rails 17 to reinforce these rails under the weight of the baskets thereon and to bear against the sides of the intermediate upright members 2 of the frame and thereby assist in guiding the rack in its vertical movements. The pairs of opposed bars or rails 17 of the rack are connected by a suitable number of cross members 21 to afford sufficient rigidity for the rack and to maintain its sides in proper spaced relation.

The baskets 7 are of such dimensions and the hooks 18 on the rack are so placed that the candy containing baskets suspended by their handles from the hooks will be aligned with the respective syrup pans beneath them, so that when the rack is lowered, the baskets will descend into the respective syrup pans, thus causing dipping of the candy contained in the baskets into the liquid syrup contained in the respective pans, and when the rack is elevated, the baskets are removed from the syrup pans into positions where they are suspended above the pans, so that surplus syrup on the pieces of candy will drain back into the respective pans. In the present instance, three syrup pans are provided and three sets of baskets supporting rails are employed, the single rack in its downward and upward movements serving to effect dipping and removal of all of the baskets with respect to their corresponding pans, but it will be understood that different numbers of syrup pans may be used according to the desired capacity of the machine, and that the number of basket supporting rails may be varied accordingly.

Means is provided for uniformly lowering and elevating all portions of the rack incidental to the dipping and draining operations. Such means comprises preferably a shaft 22 which extends longitudinally of the frame preferably along the top thereof and is journaled in bearings 23 which are supported by cross members 24 which connect the opposite sides of the frame at intervals along its top. Cables 24$^a$ are attached to the cross members 21 of the rack, these cables being wound upon the portions of the shaft 22 adjacent to the bearings 23. Preferably adjustable eyes 25 are employed to connect the cables with the respective cross members 21, these adjustable eyes enabling the tension on the different cables 24 to be equalized, thus distributing the lifting tension exerted throughout the extent of the rack. Proper adjustment of the eyes will enable the load on the rack to be sustained without distortion and consequent binding of the rack against the frame. One end of the shaft 22 may be provided with a pulley 26, and this pulley may be belted or otherwise connected to an electric motor or other power device whereby the shaft 22 may be revolved in a direction to wind the cables and thereby raise the rack or rotate it in a reverse direction to unwind the cables and thus permit lowering of the rack; or the pulley 26 may be adapted to receive a chain 27 arranged for operation by hand to raise and lower the rack, and a hook 28 on the frame may be engaged with the chain to retain the rack in raised position.

In using a machine embodying the present invention for the crystallizing of candy or similar confections, the pieces of candy are placed in the various baskets, and this may be done at any convenient point while the baskets are removed from the rack. The baskets are preferably of such depth as to enable a number of layers of candy to be placed therein. The baskets which are of wire or other open-work form are placed in the rack and suspended by their handles on the hooks provided for this purpose. The hot liquid syrup is transferred from the cooker to the pans through the pipe 16 and by the use, for example, of a portable syrup pump, the syrup entering the pans above the water jackets in the bottoms thereof. The syrup is then cooled by circulating cold water through the water jackets of the different pans. These operations are performed while the rack is in its upper or raised position and by lowering the rack the baskets containing the candy are submerged in the syrup contained in the respective pans. After crystallization has taken place, the rack is raised, causing the baskets containing the candy to be lifted out of the syrup contained in the respective pans, but the baskets are suspended above the respective pans, so that the surplus syrup will drain freely from the candy in the baskets back into the pans. After the candy has been thoroughly drained, the baskets are removed from the rack and the candy emptied therefrom. The baskets may be cleaned by dipping in hot water. The syrup is drained from the pans through the pipe 16, as by means of a syrup pump, and thus returned to the syrup cooker for the next operation, and complete removal of the syrup from the pans may be accomplished by means of a squeegee or scraper which may be manipulated by hand through the openings provided in the frame and rack so as to cause all of the syrup to reach the syrup outlet, and after the syrup has been drained from the pans, the latter may be cleaned by water, thus preparing them for the next operation.

The provision of a rack having a multiple number of sets of basket supporting hooks in conjunction with a multiple number of superposed syrup pans enables the superposed rows of candy containing baskets to be simultaneously lowered into the respective pans to dip the candy into the syrup therein and raised simultaneously to positions above the respective pans where the candy will drain surplus syrup back into the pans, and hence these operations may be performed quickly and with minimum labor and spilling or splashing of the syrup is avoided so that waste thereof is avoided and the machine may be maintained in a sanitary condition. The cooling jacket provided for the bottom of each pan enables the hot syrup to be quickly and uniformly cooled to the proper point to produce the best crystallization, and moreover, the crystallization of all candy at each operation and by successive operations will be uniform.

I claim as my invention:—

1. A crystallizing machine comprising a plurality of superposed syrup pans, and a member carrying means for supporting articles above the respective pans and movable to submerge the articles simultaneously in the respective pans at one operation.

2. A crystallizing machine comprising superposed syrup pans, and superposed basket-supporting means interposed between the pans and connected and operative to simultaneously dip articles in the baskets in the respective pans.

3. A crystallizing machine comprising a frame having syrup pans arranged in superposed relation therein, and a rack embodying members movable vertically in said frame at opposite sides of the pans therein and having means for supporting baskets for dipping into the respective pans.

4. A crystallizing machine comprising a frame having superposed syrup pans therein, a rack movable vertically in said frame and straddling the pans therein, said rack having means for supporting baskets between the pans for dipping in the respective pans.

5. A crystallizing machine comprising a frame having longitudinal members to support superposed syrup pans therein, a rack embodying members movable vertically in said frame at the outer sides of said pan supporting members, and means carried by the rack for removably supporting baskets above the respective pans.

6. A crystallizing machine comprising a frame provided with means for supporting syrup pans in superposed position therein, a rack embodying members movable vertically in the frame at opposite sides of the pans therein and having means for suspending a plurality of superposed baskets above the respective pans, and means for raising and lowering the rack relatively to the frame.

7. A crystallizing machine comprising a frame having syrup pans therein, a rack movable vertically relatively to the frame and straddling the pans therein, said rack having means for supporting a plurality of baskets, one above each pan, and a shaft operatively connected to the rack for raising and lowering it.

8. A crystallizing machine comprising a frame having superposed syrup pans therein, a rack movable vertically in the frame and carrying means for supporting baskets above the respective pans, a shaft, and cables adapted to wind on and unwind from said shaft and connected to the rack for raising and lowering it.

In testimony whereof I have hereunto set my hand.

PAUL SIDNEY HENDERSON.